United States Patent [19]

McElhaney

[11] Patent Number: 4,934,641
[45] Date of Patent: * Jun. 19, 1990

[54] CURVED SURFACE SUCTION MOUNTING APPARATUS

[76] Inventor: Kirk E. McElhaney, 7150 S. 92nd E. Ave. #402, Tulsa, Okla. 74133

[*] Notice: The portion of the term of this patent subsequent to Mar. 26, 2002 has been disclaimed.

[21] Appl. No.: 726,779

[22] Filed: Apr. 24, 1985

[51] Int. Cl.⁵ .............................................. F16B 47/00
[52] U.S. Cl. ................................ 248/206.2; 248/362; 248/363
[58] Field of Search .................... 248/205.5, 362, 363, 248/206.2, 206.3, 206.4, 205.6, 205.7, 205.8, 205.9, 310, 149; 273/3; 269/21

[56] References Cited

U.S. PATENT DOCUMENTS

| | | | |
|---|---|---|---|
| 3,073,268 | 1/1963 | Cole | 269/21 X |
| 3,207,503 | 9/1965 | Clover et al. | 248/74.5 X |
| 3,750,991 | 8/1973 | Ragir | 248/205.8 |
| 3,765,638 | 10/1973 | Harrison | 248/310 X |
| 3,863,568 | 2/1975 | Frederick | 248/205.8 |
| 4,221,356 | 9/1980 | Fortune | 248/363 |
| 4,506,855 | 3/1985 | McElhaney | 248/206.2 |

Primary Examiner—Ramon O. Ramirez

[57] ABSTRACT

Apparatus for suction mounting to a curved surface, such as a section of pipe, is disclosed. The apparatus is particularly suited for securing a container of industrial articles, such as tools and supplies, on a curved surface. The suction mounting apparatus includes a housing having a diaphragm assembly carried thereon. The diaphragm assembly includes a curved backing plate structure having a centralized opening therein to the interior of the housing. The assembly further includes a pad of pliable material disposed adjacent the backing plate and being of a configuration conforming to the periphery of the backing plate. The pad further includes an upstanding lip extending about its periphery, the lip being disposed in an overlapping relationship with the peripheral edge of the backing plate. A crankshaft is carried in the housing and connected to the diaphragm pad. Upon rotation of the crankshaft, a portion of the diaphragm pad proximate the opening in the backing plate is drawn upward, thereby creating a suction force that urges the backing plate toward the curved surface. A locking mechanism holds the crankshaft in position and maintains the suction force.

1 Claim, 7 Drawing Sheets

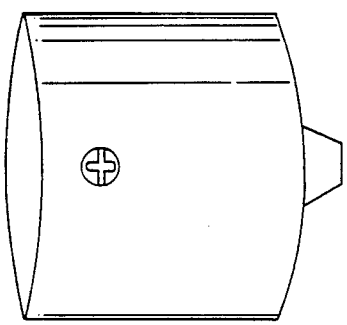
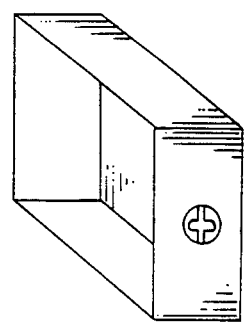
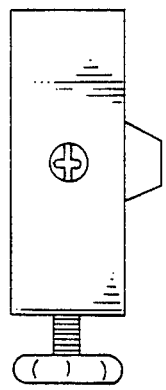
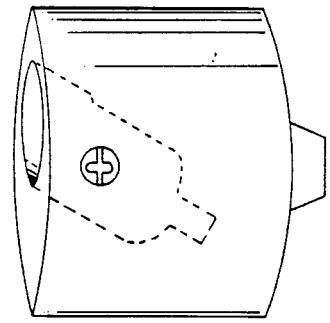
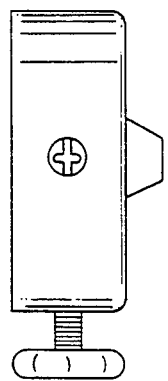
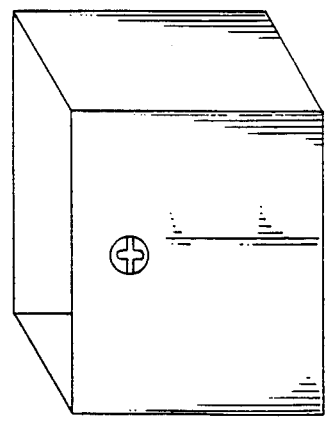

CURVED SURFACE SUCTION MOUNTING APPARATUS

BACKGROUND OF THE INVENTION

The present invention relates to suction mounting apparatus; and more particularly, it relates to suction mounting apparatus for supporting industrial tools, supplies and materials.

In most industrial fabrication, construction or repair situations, there is the need to place various tools and supplies in proximity to the worker. For example, in situations involving welding operations, it is typically the case that many welding rods are consumed, and it is desirable to keep a bulk supply of rods within easy access of the welder. This can, however, be particularly troublesome in certain instances, such as in piping construction, where the available locations for placement of the necessary supplies require awkward movements by the worker to gain access.

The present invention provides a solution to the problems of worker access to supplies and tools encountered in many situations, particularly those where easiest access calls for locating the items on a curved surface.

SUMMARY OF THE INVENTION

In accordance with the present invention, suction mounting apparatus for placement on a curved surface is provided. In such apparatus, a curved backing plate having a centralized opening therein for disposition adjacent a curved surface is utilized. A diaphragm overlays the backing plate and the opening therein, and means is included for pulling the diaphragm pad toward the opening in the backing plate, to create a suction force that affixes the backing plate in position relative to the curved surface.

The backing plate and overlaying pad form a diaphragm assembly which may be carried on a housing structure having a container holder thereon. The means for drawing a suction force may suitably be a crankshaft carried in the housing and interconnected with the diaphragm pad through the opening in the curved backing plate. Suitable locking means for holding the crankshaft in position to maintain the suction force is also preferably included.

The container holder carried on the housing may be configured to hold a tray of any configuration, including rectangular, round and square.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings wherein:

FIG. 7A–7F are perspective views of various containers for use with the apparatus.

DETAILED DESCRIPTION OF AN ILLUSTRATIVE EMBODIMENT

Figure 1:
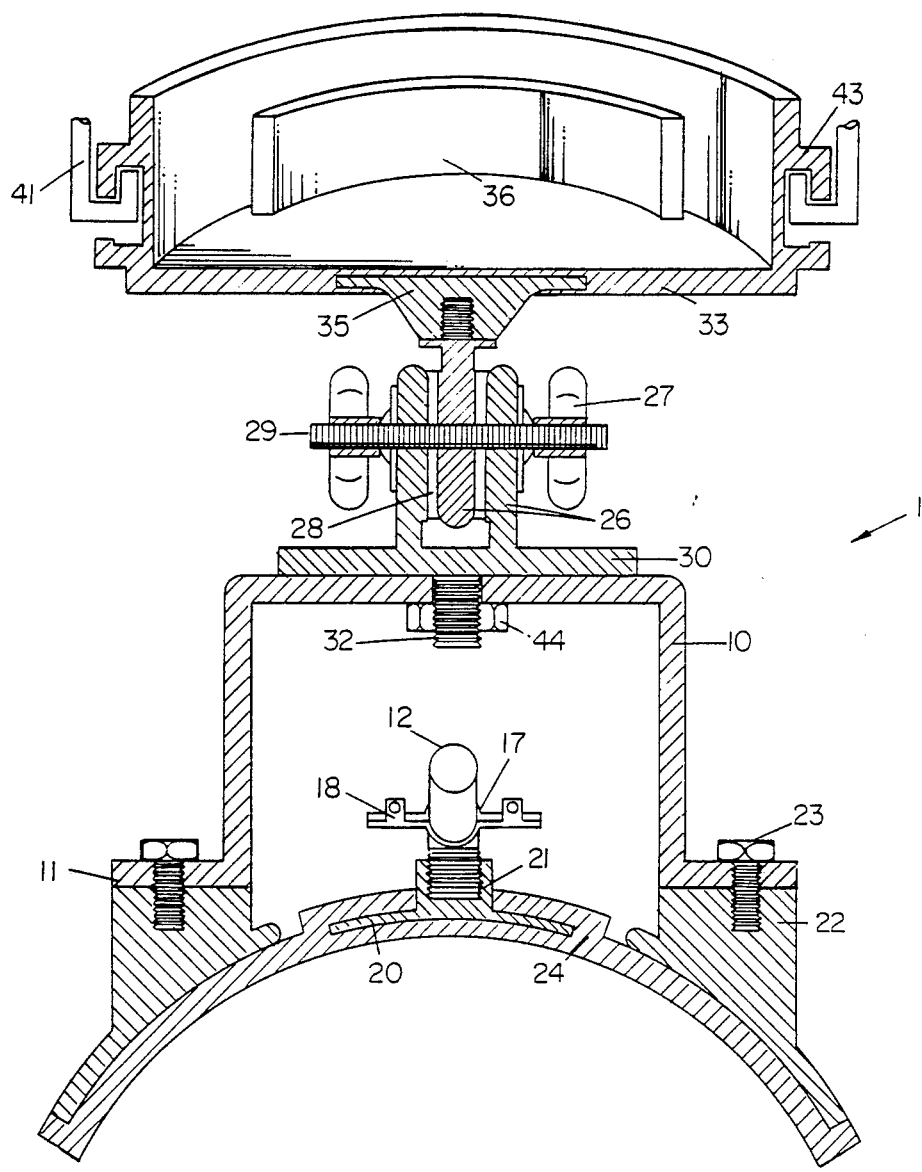
FIG. 1 is a section view of an embodiment of container suction mounting apparatus in accordance with the present invention taken along a vertical section plane.
Figure 2:
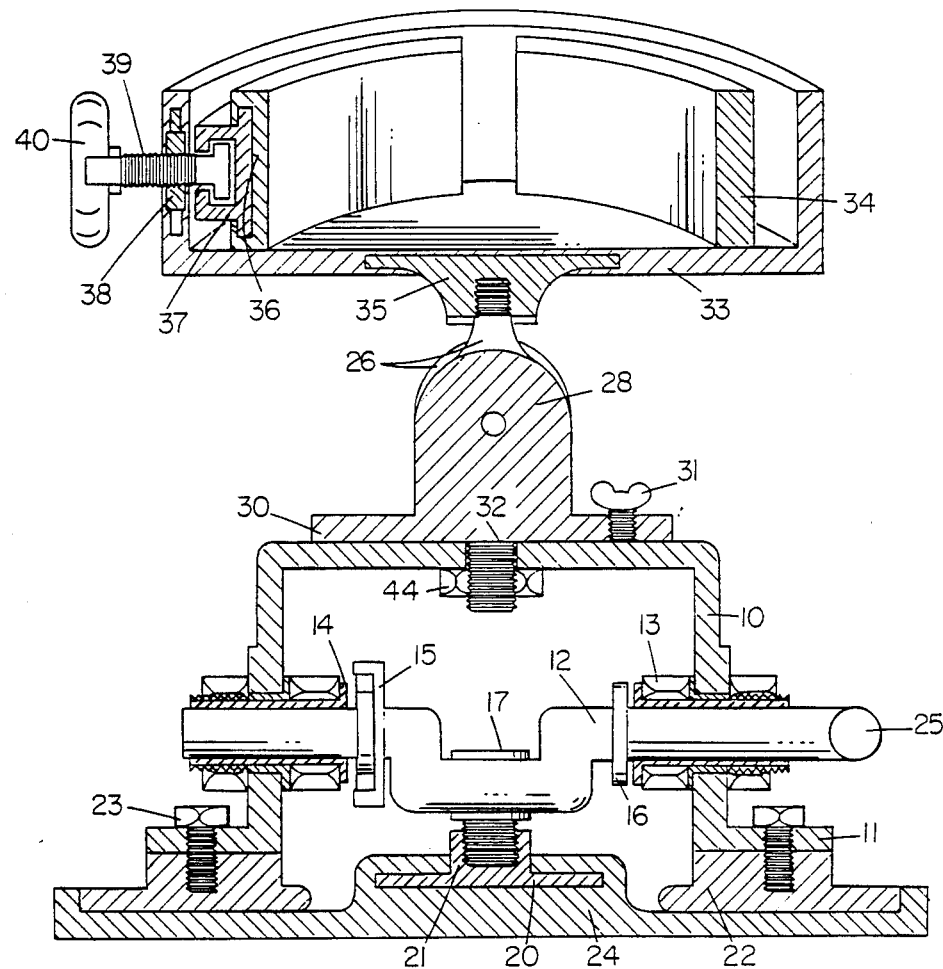
FIG. 2 is a section view of the apparatus in FIG. 1 taken along a vertical section plane which is orthogonal to that of FIG. 1.
Figure 3:
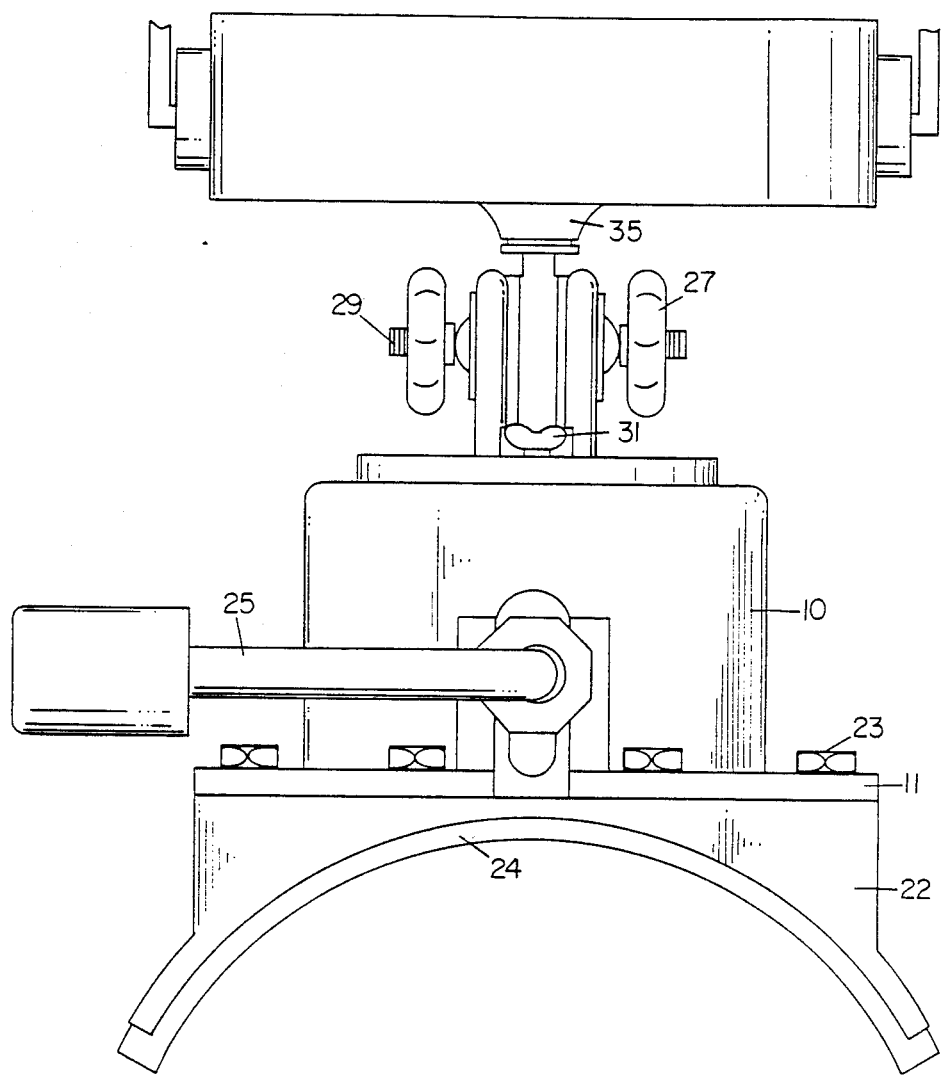
FIG. 3 is an external pictorial view of the apparatus.
Figure 4:
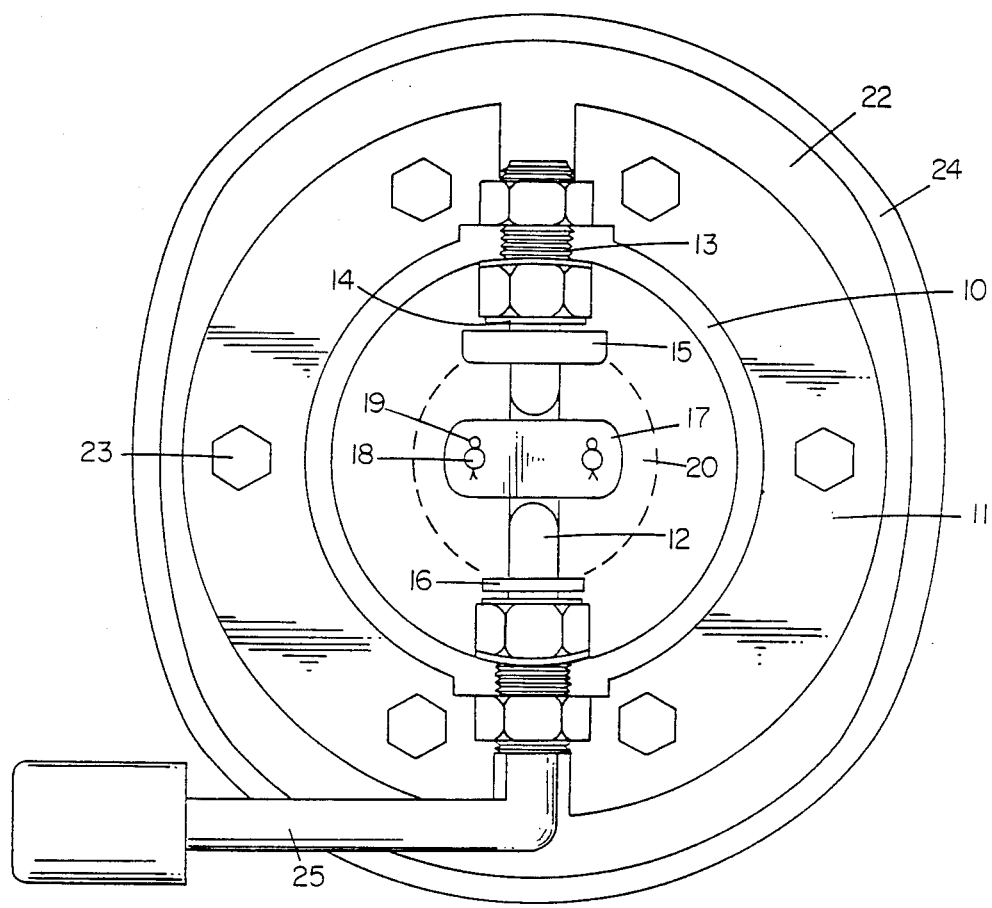
FIG. 4 is a top plan view of the apparatus.

Referring to the drawings of FIGS. 1–4, there is shown container suction mounting apparatus 1 in accordance with the present invention. The apparatus 1 includes a housing 10 made of a synthetic material or metal casting. The housing is the main body portion of the apparatus, and constitutes the basic structural support element. The housing further includes a base ring 11 which is integrally formed with housing 10. A crankshaft 12 is carried in housing 10 and supported in bushings 13 having a bushing lining 14. The bushings are provided in a steel threaded design with a hex nut external to the housing. The crankshaft is maintained in position by tightening the hex nut against the housing's outer facing. The bushing lining is preferably made of a synthetic material.

A socket locking mechanism 15 is provided on crankshaft 12 and used to lock the shaft in position when suction is drawn. Locking is achieved by urging the crankshaft laterally, and placing the lock over the hex head of the bushing. On the opposite shaft of the crankshaft journal, a stop plate 16 is provided. The stop plate holds the crankshaft centered until suction is drawn, whereupon the shaft is urged into the locking position.

A yoke 17 is carried on the journal of crankshaft 12. The yoke includes upper and lower plates clamped together by eye studs 18 having cotter pins 19 inserted therethrough.

Attached to yoke 17 is a support plate 20 imbedded in a diaphragm pad 24. Connection between yoke 17 and plate 20 is by a socket 21. The socket is shown in the embodiment being described as a threaded interconnection.

The diaphragm pad is disposed adjacent a backing plate 22 of a synthetic material or metal casting. The backing plate is connected by bolts 23 to housing 10. Diaphragm pad 24 is configured to conform to the periphery of the backing plate, and includes an upstanding lip extending about the periphery of the plate and disposed in an overlapping relationship with the peripheral edge of the backing plate. As shown, the backing plate is curved to correspond to the curved surface against which it is placed. Furthermore, the backing plate structure has a centralized opening therein to the interior of housing 10. It is through this centralized opening that the connecting structure between plate 20 and yoke 17 extends.

Preferably, the diaphragm pad 24 is made of a soft grade of rubber, for example, gum rubber. It is the diaphragm pad that forms the suction force to the surface as the yoke is moved in an upward direction. The diaphragm pad has an outer lip which engages the backing plate edge to hold the pad in position as suction is drawn.

Rotation of crankshaft 12, and consequently raising of yoke 17, is facilitated by lever 25 formed on the end of crankshaft 12.

Figure 5:
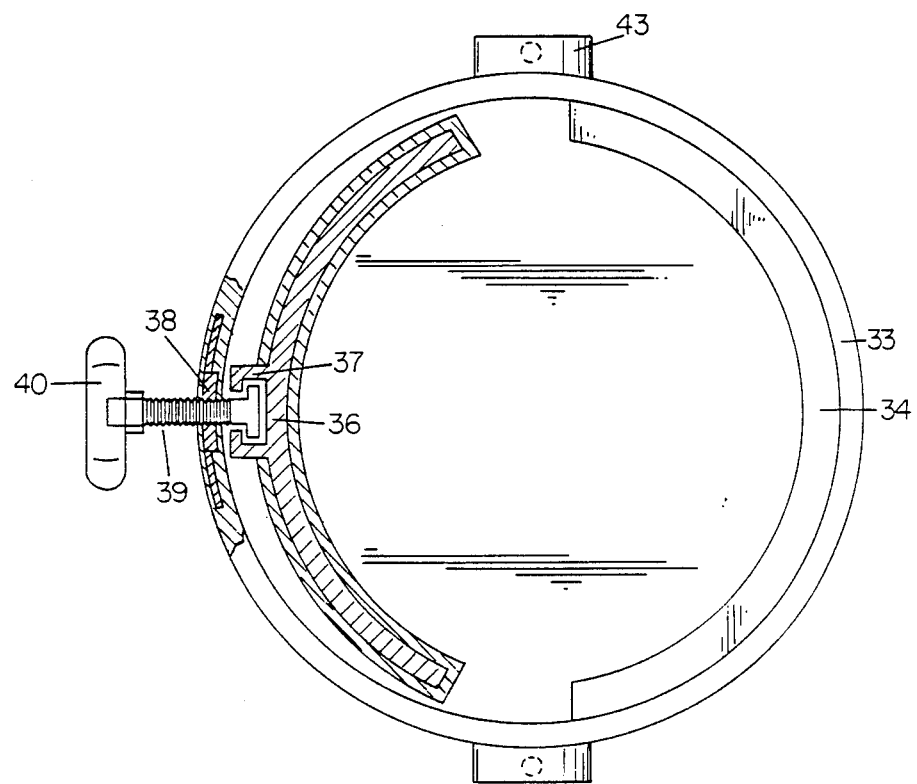
FIG. 5 is a plan view of the container clamp of the apparatus.
Figure 6:
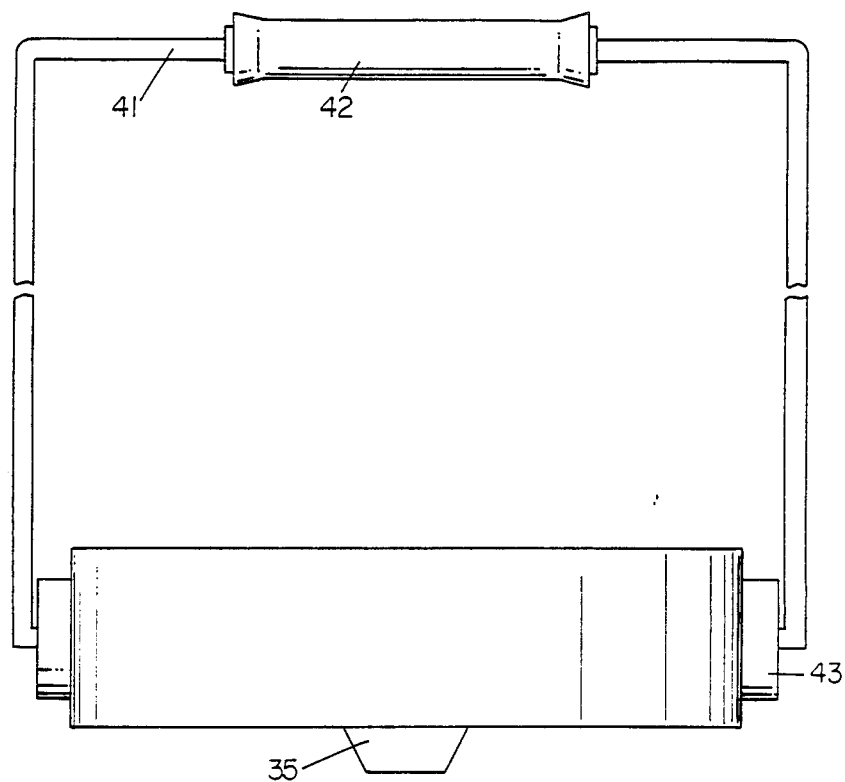
FIG. 6 is a side view of the carrying handle of the apparatus.

In order to support a container on housing 10, a swivel base structure 30 is provided. A threaded shaft 32 on the bottom side of base 30 extends through an opening in the top of housing 10 and receives thereon a lock nut 44. This secures the base to the housing. Extending from the top side of base 30 is a swivel connection 26 having inner and outer portions 26A and 26B with discs 28 disposed therebetween. The inner portion 26A is rotatable with respect to the outer portion 26B, and the discs 28 provide a frictional engagement between the two portions. Knobs 27 threaded on shaft 29 provide for tightening of the outer swivel portions against the inner portion. A threaded extension on the inner swivel portion receives thereon a threaded mounting plate 35 on the bottom of a container holder 35. A circular container holding structure 33 is shown carried by apparatus 1 in FIGS. 1-6. However, the alternate container configurations shown in FIGS. 7A through 7F may be substituted for container holder 33.

In the container holder shown, a lining 34 is included. In the outer wall structure is imbedded a threaded insert 38. Extending through the threaded inset and into engagement with an impingement support structure 37 is shaft 39. An adjustment knob 40 is provided on the outer end of shaft 39. As will be appreciated, by rotation of knob 40, shaft 39 advances within threaded inset 38 and results in impinging movement of plate 36 against a round container placed therein.

The container holder 33 may further include a carrying handle 41 having a handle grip 42 and detachable handle mounts 43. Handle 41 facilitates ease in carrying the apparatus.

The foregoing description has been directed to but a single illustrative embodiment for purposes of explanation and illustration. It is to be understood that many modifications and changes can be made in the apparatus illustrated. It is the Applicant's intention in the following claims to cover all equivalent modifications as fall within the scope of the invention.

What is claimed is:

1. Apparatus for vacuum mounting to a curved surface, comprising:
   a housing;
   a curved backing plate attached to the housing having a centralized opening therein, for disposition adjacent a curved surface;
   a diaphragm pad overlying said backing plate and the opening therein;
   a crankshaft mechanism carried in the housing for pulling said diaphragm pad toward the opening in the backing plate, to create a suction force urging the backing plate against the curved surface; and
   a locking mechanism, for establishing the crankshaft in a fixed position relative to the housing to maintain the suction force.

* * * * *